(12) United States Patent
Boulanov

(10) Patent No.: US 7,685,844 B2
(45) Date of Patent: Mar. 30, 2010

(54) METHOD AND DEVICE FOR PRODUCING MINERAL FIBRES

(75) Inventor: Oleg Boulanov, Rantigny (FR)

(73) Assignee: Saint-Gobain Isover, Courbevoie (FR)

( * ) Notice: Subject to any disclaimer, the term of this patent is extended or adjusted under 35 U.S.C. 154(b) by 410 days.

(21) Appl. No.: 11/579,409

(22) PCT Filed: Apr. 7, 2005

(86) PCT No.: PCT/FR2005/050216

§ 371 (c)(1),
(2), (4) Date: Nov. 2, 2006

(87) PCT Pub. No.: WO2005/113461

PCT Pub. Date: Dec. 1, 2005

(65) Prior Publication Data

US 2007/0227196 A1  Oct. 4, 2007

(30) Foreign Application Priority Data

May 4, 2004 (FR) .................................. 04 04749

(51) Int. Cl.
*C03B 37/06* (2006.01)
*B29B 9/00* (2006.01)

(52) U.S. Cl. .......................................... 65/454; 264/12
(58) Field of Classification Search ........... 65/454–466, 65/478, 525; 264/12
See application file for complete search history.

(56) References Cited

U.S. PATENT DOCUMENTS

| 4,135,903 A * | 1/1979 | Ohsato et al. .................. 65/466 |
| 4,525,190 A * | 6/1985 | Kawai et al. ................... 65/517 |
| 4,957,527 A * | 9/1990 | Hnat .............................. 65/19 |
| 6,227,009 B1 * | 5/2001 | Cusick et al. .................. 65/460 |

FOREIGN PATENT DOCUMENTS

| EP | 0 189 354 | 7/1986 |
| FR | 2 401 110 | 3/1979 |

* cited by examiner

*Primary Examiner*—Steven P Griffin
*Assistant Examiner*—Jodi Cohen
(74) *Attorney, Agent, or Firm*—Oblon, Spivak, McClelland, Maier & Neustadt, L.L.P.

(57) ABSTRACT

A process for forming mineral fibers, in which at least one stream of vitrifiable material in the molten state is subjected to action of an attenuating gas flow in an attenuation zone. The gas flow in the attenuation zone is in the form of a vortex. Such a process may find application to the manufacture of fibrous products.

7 Claims, 2 Drawing Sheets

METHOD AND DEVICE FOR PRODUCING MINERAL FIBRES

The invention relates to the attenuation of mineral fibers resulting from the action of gas flows.

One fiberizing process is known that is called the external centrifugal fiberizing process. The material to be fiberized is poured in the molten state onto the peripheral band of rotating centrifugation wheels, is accelerated by these wheels, becomes detached therefrom and is partly converted into fibers owing the effect of the centrifugal force, a gas flow emitted tangentially to the peripheral band of the wheels carrying away the fibers thus formed to a receiving device and separating them from the material that has not fiberized.

This long-established fiberizing technique results in yields and quality of the fibers produced that are in general substantially inferior to what can be achieved using another technique, which combines centrifugation with gas attenuation, also called an internal centrifugal fiberizing process.

The internal centrifugal fiberizing process consists in introducing a stream of molten glass into a spinner, also called a spinner bowl, rotating at high speed and pierced around its periphery by a very large number of orifices through which the glass is thrown out by the effect of the centrifugal force. These filaments are then subjected, by means of an annular burner, to the action of an annular flow of high-temperature/high-velocity attenuation gas that hugs the wall of the spinner, which flow attenuates the filaments and converts them into fibers.

Moreover, attenuation gas flow is generally confined by means of a shroud of cold gas that suitably channels it. This gas shroud is produced by a blowing ring that surrounds the annular burner. Being cold, it so helps to cool the fibers, the mechanical strength of which is thus improved by a thermal toughening effect.

However, in the latter type of process the gas flow coming from the top of the spinner generates greater attenuation at the top of the spinner than at the bottom, resulting in an overall nonuniformity of the fibers. To obtain better uniformity of the fibers, it is known to adapt the diameter of the holes in the spinner accordingly, the holes at the bottom of the spinner being smaller than those at the top. However, this configuration makes the manufacture of the spinner more complicated.

Moreover, this process wears out the spinner, which generally has a limited lifetime of about 300 hours, and to replace it is costly.

Furthermore, it is necessary to provide cooling systems to be associated with the burners, which further complicates the final attenuation device.

The object of the invention is therefore to provide another fiberizing process in which the fiberizing device is less complicated than those of the prior art and the yield from which is just as high, and accompanied by satisfactory uniformity of the fibers obtained.

According to the invention, the process for forming mineral fibers, in which at least one stream of vitrifiable material in the molten state is subjected to the action of an attenuating gas flow in an attenuation zone, is characterized in that the gas flow in the attenuation zone is in the form of a vortex.

The invention takes advantage from the fact that a vortex flow characteristically has a lower velocity/pressure zone forming the hollow of the swirl, and then a progressive increase in velocity on going radially away from this central zone.

The central zone behaves, with respect to the incoming stream of vitrifiable material, as a suction zone from which the molten material is carried away and progressively attenuated as the velocity of the surrounding fluid progressively increases.

This results in very mild fiberizing conditions, as opposed to the known processes in which the filaments of vitrifiable material encounter, quite suddenly, a gas flow of high constant velocity.

According to one feature, the vortex is located at least partly in a combustion chamber in which a combustion zone, for combustion between at least one oxidizer and at least one fuel, is created and the stream is introduced into the combustion zone of the combustion chamber.

Preferably, the combustion zone is located at least partly in the attenuation zone and the stream in the combustion zone follows the lines of the vortex flow.

In this configuration, the central zone of the vortex is a suction zone for the fresh fuel and oxidizer, in which the inflammable mixture is produced. The combustion creates a hot zone in the core of the vortex, the temperatures decreasing toward the outside of the flow.

These conditions advantageously help to reduce the thermal and mechanical stresses to which the metal components surrounding the combustion zone are subjected, the hot zone of the vortex being confined away from said components. It is therefore no longer necessary to use cooling systems as in the prior art.

According to another feature, the combustion is stabilized in the vortex by adapting the combustion rate at the inlet of the combustion zone.

Advantageously, the oxidizer available around the combustion zone is stirred so as to minimize the volume of oxidizer supplied and replenished.

According to another feature, the molten material has a viscosity of between 50 and 300 Pa·s.

The stream of vitrifiable material may be introduced into a lower velocity/pressure zone of the vortex, which may be regulated by controlling the direction of entry of the oxidizer into the attenuation zone and/or the combustion zone.

The invention also relates to a mineral fiber attenuation device. This comprises a feed channel for feeding the molten vitrifiable material, the channel delivering the material into an attenuation zone equipped with attenuation gas inlet means, and being characterized in that the configuration of the attenuation zone is designed to create a gas flow in the form of a vortex.

According to one feature, the device includes means for regulating the attenuation gas inlet velocity so as to keep the vortex stable.

The device includes a combustion chamber into which fuel and oxidizer feed lines run, the combustion gases preferably forming part of the attenuation gas in the attenuation zone.

Means for varying the oxidizer inlet velocity and direction, which may constitute the means for regulating the attenuation gas inlet velocity, are provided in the combustion chamber so as to stabilize the combustion and to be able to shift the hot zones of the vortex relative to the walls of the chamber.

Advantageously, the combustion chamber has axial, especially cylindrical, symmetry. In addition, the arrangement of at least one of the fuel and oxidizer feed lines forces said gas to enter the combustion chamber tangentially.

According to another feature, the combustion chamber has an external wall and an internal wall so as to leave between the two walls a peripheral cavity that receives the oxidizer, the internal wall having a peripheral open portion that links the cavity to the inside of the chamber where the combustion zone is intended to be located.

Advantageously, the means for varying the oxidizer inlet velocity and direction consist of fins that are capable of pivoting and capable of being fixed, by pivoting about a variable angle of inclination in order to partially close off, in a variable manner, the internal wall through which the oxidizer enters into the chamber.

Furthermore, the fins are, on the one hand, attached to the internal wall in the open portion and, on the other hand, fastened to a peripheral element placed in the cavity, the actuation of the peripheral element causing the fins to pivot.

Preferably, it includes a mechanical stirrer placed inside the chamber and capable of stirring the oxidizer, both the configuration and the arrangement of the stirrer being designed not to impede the combustion zone. This stirrer constitutes complementary means for regulating the inlet velocity of the oxidizer or attenuation gas, so as to control the vortex.

So as to deliver from in the chamber the molten material to be fiberized, the material feed channel is linked to a bore made in the combustion chamber, more particularly in its upper portion.

Advantageously, delivery means are linked to the feed channel and consist, for example, of a bushing, the bottom plate of which is pierced with orifices through which the material flows. As a variant, the delivery means consist of a basket pierced with orifices through which the material flows, the basket being able to be rotated.

Finally, the device preferably includes a diffuser placed in the extension of the attenuation zone, this diffuser ensuring fiber attenuation continuity.

Thus, the device has, for the abovementioned features, combustion ignition, combustion stability and parameter adjustment facilities and ensures rapid response to the adjustments made for adapting the desired fiberizing operation.

The invention applies to the manufacture of fibrous materials, such as especially thermal and/or acoustic insulation products based on mineral wool, in which the mineral fibers are optionally bonded together by an appropriate binder.

The fibers manufactured by the device of the invention very advantageously have a uniform length and a uniform diameter which are fixed by adapting the parameters, in particular the velocity and the quantity of air blown into the combustion chamber. The fibers, which may just as well be short as long (from less than 2.5 cm up to about 1 m), have a fixed diameter within a broad dimensional range, from 0.5 to 25 µm.

The terms "lower" and "upper" in the rest of the description should be understood as the lowest and highest portions, respectively, of an element facing the device of the invention, which, when put into place for its operation, receives the stream of material to be fiberized from the top downward.

Other advantages and features of the invention will now be described in greater detail in conjunction with the appended drawings in which.

These figures are schematic, and have not been drawn strictly to scale in order to make it easier to understand them.

Figure 1:
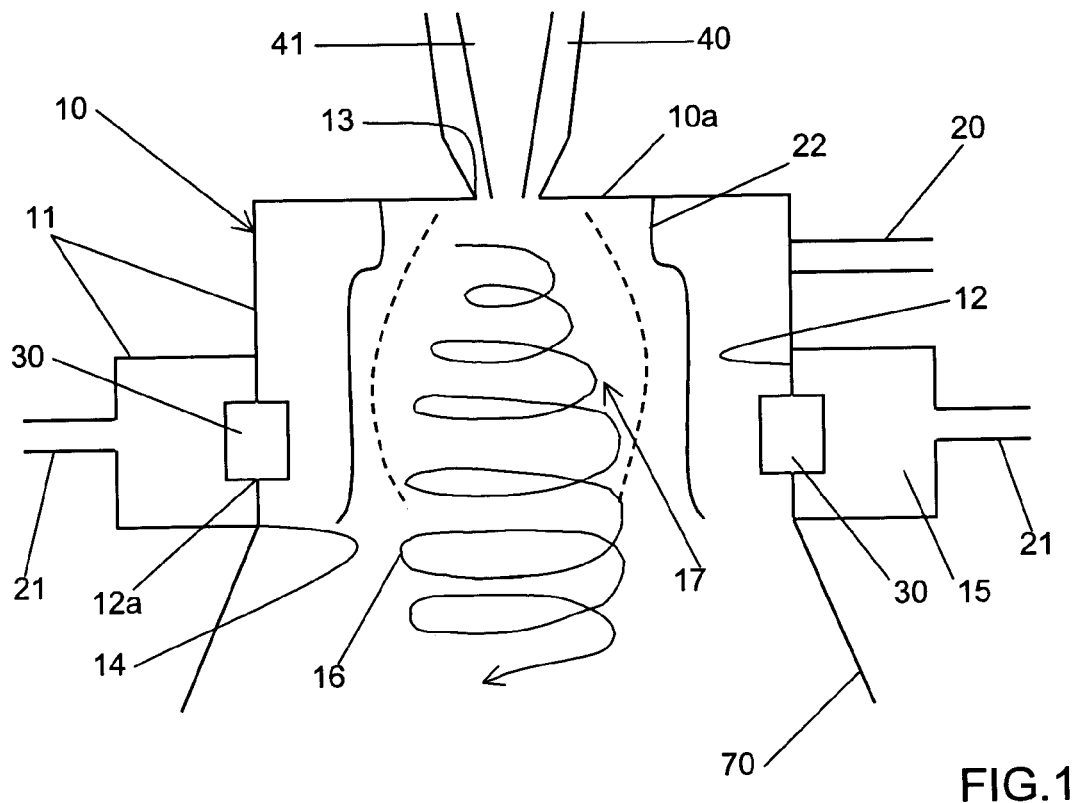
FIG. 1 shows a schematic sectional view of the device for implementing the process according to the invention.

FIG. 1 shows, in cross section and in a vertical plane, a device 1 for implementing the mineral fiber attenuation process according to the invention.

The device comprises a combustion chamber 10, at least one feed line 20, for feeding a fuel such as a gas, at least one feed line 21 for feeding an oxidizer such as air, and means 30 for varying the velocity and direction of the oxidizer delivered into the chamber.

The combustion chamber 10 has an external side wall 11, an internal side wall 12, open at 12a around its entire perimeter, a bore 13 made in the upper face 10a of the chamber, and an opening 14, opposite the bore, made in the lower face of the chamber and bounded by the internal wall 12.

The external 11 and internal 12 walls define a peripheral cavity 15. Since the walls 11 and 12 have cylindrical cross sections, the cavity is in the form of a hollow ring.

The gas feed line 20 preferably runs directly into the upper portion of the combustion chamber through the external wall 11, whereas the air feed lines 21, three in number here, run into the hollow ring 15 in the lower portion of the chamber. The three air feed lines, which are advantageously spaced equidistantly around the periphery of the cavity, and also the presence of this cavity make it possible for the volume of incoming air to be made uniform throughout the chamber.

The air delivery into the chamber 10 with a suitable velocity creates a gas flow in the form of a vortex. The vortex extends into a zone 16 intended to form the attenuation zone.

When, in turn, the fuel is delivered, it is mixed with the air and, by ignition of a standard spark plug (not shown in the figures) placed in the combustion chamber, the mixture is ignited, creating a combustion zone 17 confined in the zone identified by the broken lines in the figure.

The suitable mixing of the oxidizer and fuel in the chamber 10, the suitable inlet velocity of the oxidizer in the chamber and the configuration of the chamber result in the combustion zone 17 being positioned in the attenuation zone 16. The attenuation zone, being in the form of a vortex, ensures that the combustion follows the flow lines of the vortex.

The means 30 for varying the velocity and direction of the air entering the chamber 10 are fastened to the internal wall 12 and are intended to close off, in a variable manner, the open portion 12a of this wall.

Figure 2:
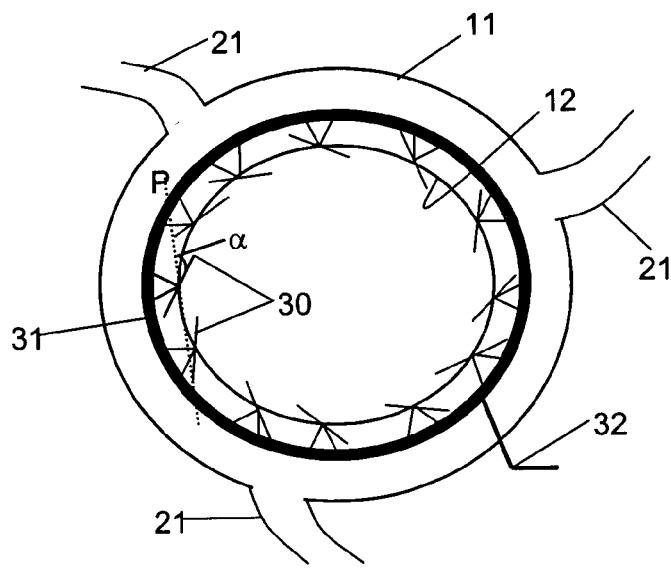
FIG. 2 illustrates a sectional top view of the device.

The means 30 for varying the velocity and direction consist of fins that are attached, at their upper and lower ends, on either side of the open portion 12a. These fins are capable of pivoting about an axis passing through their points of attachment to the wall 12a. They are capable of being held in a fixed position at a chosen angle of inclination α to the plane P tangential to the fin attachment points (FIG. 2).

The fins 30 are also fastened at their axis of rotation to a peripheral element 31, such as a disk, which is placed in the hollow ring 15 of the chamber and the rotation of which causes said fins to pivot. This disk is connected to a gripping member 32, the actuation of which allows the disk to rotate, which gripping member is combined with locking means (not illustrated) for preventing the disk from rotating.

The fins allow the variation in the area of closure of the open portion 12a to be controlled, and consequently allow the velocity and the direction of air entering the combustion chamber to be varied. The larger the angle of inclination α, that is to say the less closed the open portion 12a of the wall, the less the air is accelerated when it enters the chamber, whereas the smaller the angle of inclination α, the fins therefore being oriented as tangentially as possible to the internal wall 12, closing off the open portion 12a as far as possible, the greater the acceleration of the air entering the chamber.

The variation in the velocity and direction of the air entering the chamber causes in the hot combustion zone 17 to be shifted, and consequently this modifies the attenuation conditions, in particular the degree of attenuation and the attenuation temperature, thereby affecting the fineness of the fibers, their length and their tensile strength.

Thus, to favorably place the hot zone in the center of the chamber, for which the velocity of the air is lowest, the angle of inclination of the fins must be as large as possible, the open portion 12a being closed off to the minimum extent, whereas the more the open portion 12a is closed off, greater the increase in velocity of the air entering the chamber, thereby shifting the hot zone toward the internal wall of the chamber.

Furthermore, this intake of air tangential to the surface of the wall of the combustion chamber ensures that it is continuously cooled without requiring the use of additional cooling systems.

To keep both the vortex and the combustion stable, it is necessary for the air in the chamber to be continuously rotated. In addition, a sufficient quantity of compressed air is supplied, or else, as a variant, mechanical means for stirring the air are used. Thus, in the latter variant, a mechanical stirrer 22 is provided inside the chamber 10, which stirs the combustion mixture and thus sustains the vortex, without having to continuously inject a further quantity of air.

This stirrer 22 consists, for example, of rotary blades attached in the upper portion of the chamber and extending right to the bottom of the opening 14. They have a suitable shape so as to leave sufficient space to create the vortex and to sustain it.

The attenuation of the fibers takes place by the molten material flowing along the vortex. The material flows from a feed channel 40, to which the device is connected, and passes through the bore 13.

Several embodiments of the flow of material from the feed channel into the combustion chamber may be envisioned.

According to a first embodiment, the material flows directly through the bore 13.

According to a second embodiment, the material flows through the bore 13 via delivery means.

Figure 3:
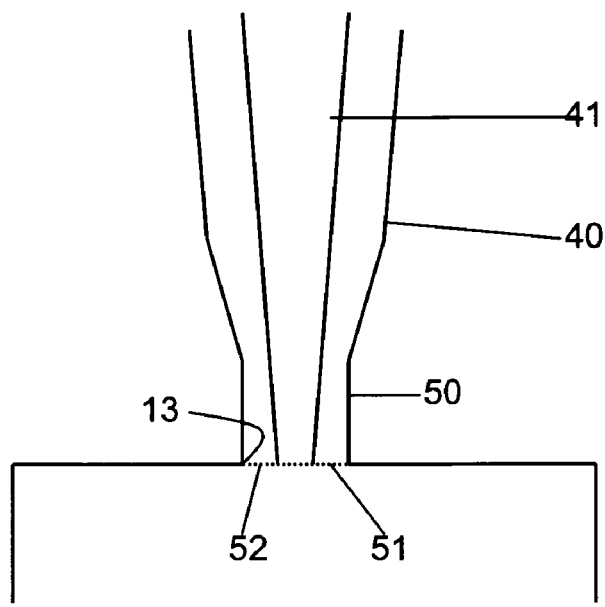
FIG. 3 shows a partial view of one embodiment of the flow of material to be attenuated in the device.

The delivery means, as illustrated in FIG. 3, may consist of a bushing block 50, which is placed between the feed channel 40 and the upper face of the combustion chamber. The bushing includes a bottom plate 51 that has a width equivalent to that of the bore 13 and is placed level with the latter. The bottom plate 51 is provided with a plurality of orifices 52 from which the primary filaments of molten material flow, these filaments being intended to be attenuated in the chamber.

Figure 4:
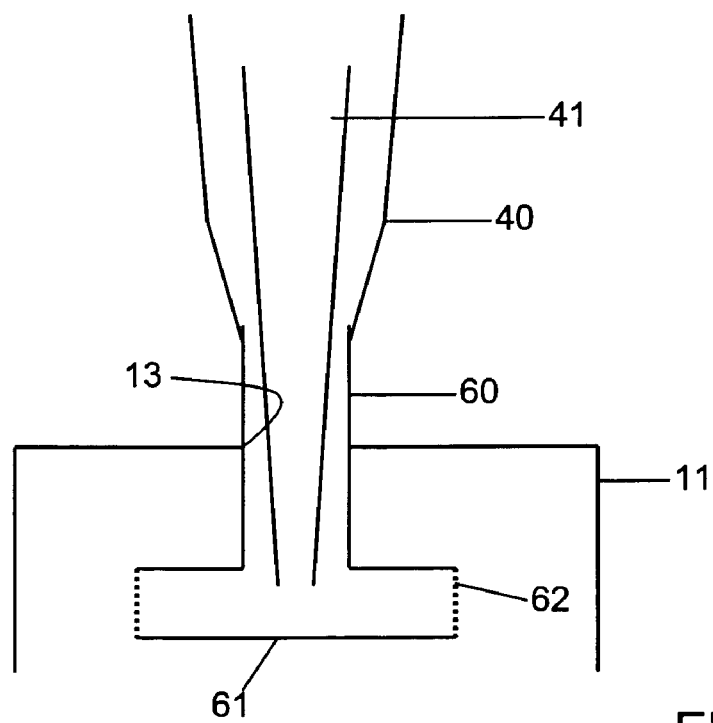
FIG. 4 shows a partial view of another embodiment of the flow of material to be attenuated in the device.

In the embodiment shown in FIG. 4, the delivery means are formed by a hollow shaft 60, attached to the end of which is a basket 61. The shaft, which passes through the bore 13, connects the feed channel 40 to the basket, which is placed inside the combustion chamber. The side wall of the basket 61 is pierced by orifices 62 from which the molten material to be attenuated is ejected in the form of primary filaments. Advantageously, the basket 61 can be rotated.

Finally, to promote the attenuation, a diffuser 70, such as a truncated cone, may be combined with the combustion chamber along the extension of the opening 14.

The diffuser is used to channel the flow of gas coming from the combustion in the chamber, this flow of high-temperature gas continuing and ending the attenuation, in order to obtain even longer and finer fibers.

The attenuation process of the invention will now be described with regard to the implementing device described above.

The oxidizer is delivered into the combustion chamber with a velocity suitable for creating a gas flow in the form of a vortex.

The combustion chamber 10 is then fed with fuel. When the oxidizer and the fuel have been sufficiently mixed, a spark is generated by igniting the spark plug, which immediately ignites the mixture, creating a combustion zone 17.

The oxidizer inlet velocity is adapted so that the combustion follows the flow lines of the vortex.

Molten material flowing out from the bore 13 of the chamber is delivered directly into the combustion zone 17. The attenuation is initiated and continues by the material flowing along the flow lines of the vortex. The gases confined within the diffuser 70 allow the attenuation conditions to be extended.

The fibers are then collected at the outlet of the device.

The diameter and the length of the fibers obtained can be varied according to the attenuation conditions set, particularly by varying the position of the vortex and therefore the velocity of the air entering the chamber, the presence of the diffuser and the type of flow of the material (with or without a manifold).

In another embodiment, the attenuation zone may be separate from the combustion zone. Attenuation gas feed means, which may consist of the feed lines 21, the blowing ring 15 and its fins 30, and also optionally the stirrer 22, are provided so as to create the attenuation zone in the form of a vortex.

The invention claimed is:

1. A process for forming mineral fibers, comprising:
   subjecting at least one stream of vitrifiable material in the molten state to action of an attenuating gas flow in an attenuation zone,
   wherein the gas flow in the attenuation zone is in a form of a vortex,
   wherein the stream of vitrifiable material is introduced into a lower velocity/pressure zone of the vortex, and
   wherein a position of the lower velocity/pressure zone is regulated by controlling a direction of entry of an oxidizer into at least one of the attenuation zone or a combustion zone.

2. The process as claimed in claim 1, wherein the combustion zone is located at least partly in the attenuation zone and a stream in the combustion zone follows lines of the vortex flow.

3. The process as claimed in claim 2, wherein combustion is stabilized in the vortex by adapting combustion rate at an inlet of the combustion zone.

4. The process as claimed in claim 2, wherein the oxidizer available around the combustion zone is stirred so as to minimize volume of oxidizer supplied and replenished.

5. The process as claimed in claim 1, wherein viscosity of the molten material at an inlet of the combustion zone is between 50 and 300 Pa·s.

6. The application of the process as claimed in claim 1 for manufacture of at least one of fibrous materials, thermal, or acoustic insulation products based on mineral wool.

7. The process as claimed in claim 1, wherein the vortex is located at least partly in a combustion chamber in which the combustion zone, for combustion between at least one oxidizer and at least one fuel, is created and the stream is introduced into the combustion zone of the combustion chamber.

* * * * *

UNITED STATES PATENT AND TRADEMARK OFFICE
CERTIFICATE OF CORRECTION

PATENT NO. : 7,685,844 B2 Page 1 of 1
APPLICATION NO. : 11/579409
DATED : March 30, 2010
INVENTOR(S) : Oleg Boulanov It is certified that error appears in the above-identified patent and that said Letters Patent is hereby corrected as shown below:

Column 6, line 53, change "Pa·s" to --Pa.s--.

Signed and Sealed this

Third Day of August, 2010

David J. Kappos
*Director of the United States Patent and Trademark Office*